(12) United States Patent
Huang

(10) Patent No.: US 10,990,212 B2
(45) Date of Patent: Apr. 27, 2021

(54) TOUCH DISPLAY DEVICE

(71) Applicant: HKC CORPORATION LIMITED, Guangdong (CN)

(72) Inventor: Beizhou Huang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/648,353

(22) PCT Filed: Jan. 10, 2018

(86) PCT No.: PCT/CN2018/072065
§ 371 (c)(1),
(2) Date: Mar. 18, 2020

(87) PCT Pub. No.: WO2019/056663
PCT Pub. Date: Mar. 28, 2019

(65) Prior Publication Data
US 2020/0218386 A1  Jul. 9, 2020

(30) Foreign Application Priority Data

Sep. 19, 2017 (CN) .......................... 201710844990.0

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 3/04164* (2019.05);
(Continued)

(58) Field of Classification Search
CPC ............... G06F 3/0412; G06F 3/04164; G06F 3/04166; G06F 3/047; G06F 2203/04107;
(Continued)

(56) References Cited

U.S. PATENT DOCUMENTS

2007/0268421 A1* 11/2007 Chiu ................. G02F 1/133516
349/42
2010/0079694 A1* 4/2010 Yoshida ............ G02F 1/134363
349/40
(Continued)

FOREIGN PATENT DOCUMENTS

CN 1916701 A 2/2007
CN 103941908 A 7/2014
(Continued)

*Primary Examiner* — Ibrahim A Khan
(74) *Attorney, Agent, or Firm* — Muncy, Geissler, Olds & Lowe, P.C.

(57) ABSTRACT

A touch display device is provided. The touch display device comprises: a first substrate including a plurality of row wires, a plurality of column wires and a plurality of pixel drive elements, and the row wires and the column wires are interleaved to form a pixel matrix, and the pixel drive elements are disposed on pixels of the pixel matrix; a second substrate disposed opposite the first substrate; a display medium interposed between inner sides of the first substrate and the second substrate; a plurality of touch electrodes disposed on the inner side of the first substrate or the second substrate; and an electroconductive protection, which is disposed outside the pixel matrix on the first substrate, electrically isolated from the row wires and the column wires, and electrically connected to the touch electrodes.

18 Claims, 12 Drawing Sheets

(52) U.S. Cl.
CPC ............... *G06F 3/04166* (2019.05); *G06F 2203/04107* (2013.01); *G06F 2203/04112* (2013.01)

(58) Field of Classification Search
CPC ......... G06F 2203/04112; G02F 1/1333; G02F 1/1339; G02F 1/1362; G09G 3/36
See application file for complete search history.

(56) References Cited

U.S. PATENT DOCUMENTS

| | | | | |
|---|---|---|---|---|
| 2013/0135540 | A1* | 5/2013 | Nam | G02F 1/13338 349/12 |
| 2013/0341651 | A1* | 12/2013 | Kim | G06F 3/0445 257/84 |
| 2015/0268765 | A1* | 9/2015 | Nakayama | G06F 3/0445 345/174 |
| 2015/0370370 | A1* | 12/2015 | Ikeda | G06F 3/0412 349/12 |
| 2017/0140727 | A1* | 5/2017 | Xiao | G06F 3/04166 |
| 2018/0039145 | A1* | 2/2018 | Liao | G02F 1/133514 |
| 2018/0067584 | A1* | 3/2018 | Zhu | G06F 3/0443 |
| 2018/0095316 | A1* | 4/2018 | Park | G02F 1/13338 |
| 2018/0095318 | A1* | 4/2018 | Pyo | H01L 27/1214 |
| 2018/0150166 | A1* | 5/2018 | Aoki | G06F 3/04166 |
| 2018/0314120 | A1* | 11/2018 | Peng | G06F 3/0412 |
| 2019/0064615 | A1* | 2/2019 | Lim | H01L 27/124 |
| 2019/0138134 | A1* | 5/2019 | Ikeda | G06F 3/0412 |

FOREIGN PATENT DOCUMENTS

| | | |
|---|---|---|
| CN | 104571758 A | 4/2015 |
| CN | 105511146 A | 4/2016 |
| CN | 205452280 U | 8/2016 |
| CN | 107065272 A | 8/2017 |
| CN | 107505788 A | 12/2017 |
| CN | 107561758 A | 1/2018 |
| CN | 107561760 A | 1/2018 |
| KR | 20000027711 A | 5/2000 |

\* cited by examiner

TOUCH DISPLAY DEVICE

BACKGROUND

Technical Field

This disclosure relates to a display device, and more particularly to a touch display device.

Related Art

Flat panel displays have been widely used in various fields. The liquid crystal display device has superior features comprising the thin body, low power consumption and radiationless feature, has been gradually replaced the conventional cathode ray tube display device, and is applied to many kinds of electronic products, such as a mobile phone, a portable multimedia device, a notebook computer, a liquid crystal television, a liquid crystal screen and the like.

The liquid crystal display device comprises elements comprising a display panel. An active matrix type liquid crystal display panel is an ordinary display panel at present and comprises an active matrix substrate, opposing substrates, and a liquid crystal layer interposed between the two substrates. A plurality of row wires, column wires and pixels are disposed on the active matrix substrate. The pixel contains a pixel drive element. The pixel drive elements are connected to the row wires and the column wires. The ordinary pixel drive element is a thin film transistor. The row wire and the column wire are usually metal wires.

In the process of manufacturing the panel, for example, when the alignment film is disposed, static electricity may be generated by friction, and the static electricity generated by friction may cause the damage of the pixel drive element, and cause defects in the pixels. In order to eliminate the damage of the liquid crystal display panel caused by the static electricity, short-circuit wiring may be disposed on the active matrix substrate to electrically connect the row wires and column wires together, so that the potentials of the row wires and column wires are the same. Once the short-circuit wiring is cut, the liquid crystal display panel again encounters the problem caused by the static electricity, such as the feature defect caused by the component breakdown and the component breakdown.

SUMMARY

In view of the deficiencies of the prior art, the inventor has obtained this disclosure after the reach and development have been made. An objective of this disclosure is to provide a touch display device, and the pixel drive element can be protected from having the problem caused by static electricity.

This disclosure provides a touch display device, comprising: a first substrate including a plurality of row wires, a plurality of column wires and a plurality of pixel drive elements, and the row wires and the column wires are interleaved to form a pixel matrix, and the pixel drive elements are disposed on pixels of the pixel matrix; a second substrate disposed opposite the first substrate; a display medium interposed between inner sides of the first substrate and the second substrate; a plurality of touch electrodes disposed on the inner side of the first substrate or the second substrate; and an electroconductive protection, which is disposed outside the pixel matrix on the first substrate, electrically isolated from the row wires and the column wires, and electrically connected to the touch electrodes.

This disclosure provides a touch display device, comprising: a first substrate including a plurality of row wires, a plurality of column wires and a plurality of pixel drive elements, and the row wires and the column wires are interleaved to form a pixel matrix, and the pixel drive elements are disposed on pixels of the pixel matrix; a second substrate disposed opposite the first substrate; a display medium interposed between inner sides of the first substrate and the second substrate; a plurality of touch electrodes disposed on the inner side of the second substrate; and an electroconductive protection, which is disposed outside the pixel matrix on the first substrate, electrically isolated from the row wires and the column wires, and electrically connected to the touch electrodes.

In one embodiment, the touch electrodes are formed on an outer surface of the second substrate.

In one embodiment, the touch electrodes are formed on a touch panel, and the touch panel is disposed on an outer surface of a second substrate.

In one embodiment, the electroconductive protection is a remaining portion of short-circuit wiring which is originally connected to the row wires and the column wires on the first substrate obtained after cutting.

In one embodiment, the electroconductive protection is disposed along an edge of the first substrate.

In one embodiment, the touch display device further comprising: a row driver connected to the row wires and located on one side of the first substrate without the electroconductive protection; and a column driver connected to the column wires and located on the one side of the first substrate without the electroconductive protection.

In one embodiment, the touch display device further comprising: a row driver electrically connected to the row wires on one side of the first substrate without the electroconductive protection; and a column driver electrically connected to the column wires on the one side of the first substrate without the electroconductive protection.

In one embodiment, the touch display device further comprising: a sealing member, which is interposed between inner sides of the first substrate and the second substrate, located between the pixel matrix and the electroconductive protection and seals the display medium.

In one embodiment, the touch display device further comprising: a conductive component, which is interposed between the inner sides of the first substrate and the second substrate and connected to the electroconductive protection and an extension of the touch electrode.

In one embodiment, the touch display device further comprising: an electroconductive trace disposed outside the first substrate and the second substrate, and connected to the electroconductive protection and an extension of the touch electrode.

In one embodiment, the touch electrodes are commonly connected to an extension.

In one embodiment, the touch electrodes are not connected to each other.

In one embodiment, the display medium, the first substrate and the second substrate function as a transversal electric field effect display panel.

In summary, in the touch display device of this disclosure, the electroconductive protection is electrically isolated from the row wires and the column wires, and is electrically connected to the touch electrode. Therefore, the pixel drive element can be protected from having the problem caused by static electricity.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the drawings.

DETAILED DESCRIPTION OF THE INVENTION

Figure 1A:
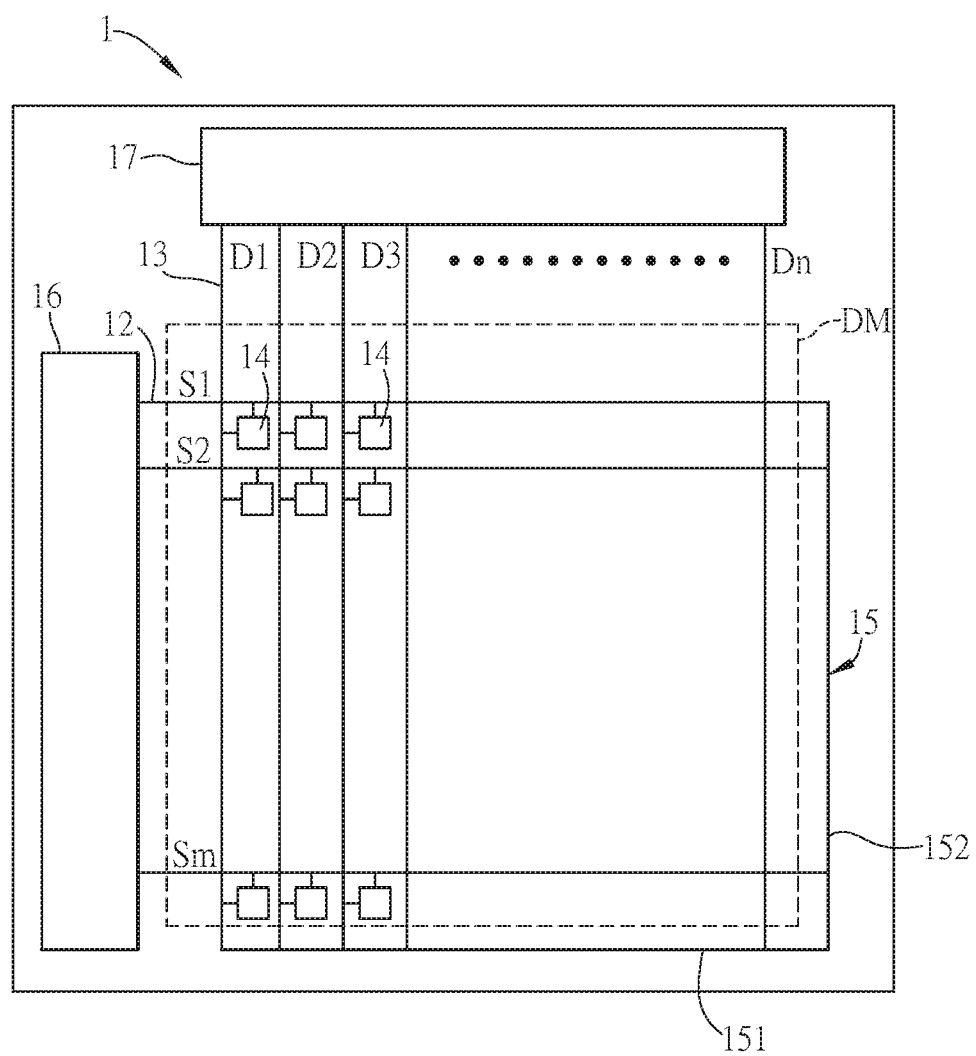
FIG. 1A is a schematic view showing a touch display device of one embodiment of this disclosure.

Specific structural and functional details disclosed herein are merely representative and are for purposes of describing example embodiments of the present invention. However, the present invention may be embodied in many alternate forms, and should not be interpreted as being limited to the embodiments set forth herein.

In the description of the present invention, it is to be understood that the term "center", "lateral", "upper", "lower", "left", "right", "vertical", "horizontal", "orientation or positional relationship indicated top", "bottom", "inner", "outer" as the location or position based on the relationship shown in the drawings, for convenience of description only and the invention is to simplify the present description, not indicate or imply that refers to devices or elements must have a specific orientation, the orientation of a particular configuration and operation, cannot be construed as limiting the present invention. In addition, the terms "first", "second" are used to indicate or imply relative importance or the number of technical features specified implicitly indicated the purpose of description and should not be understood. Thus, there is defined "first", "second" features may be explicitly or implicitly include one or more of the features. In the description of the present invention, unless otherwise specified, the meaning of "more" is two or more. Further, the term "comprising" and any variations thereof, are intended to cover non-exclusive inclusion.

In the description of the present invention, it is noted that, unless otherwise expressly specified or limited, the terms "mounted," "connected to", "connected" are to be broadly understood, for example, may be a fixed connection, may be a detachable connection, or integrally connected; may be a mechanical connector may be electrically connected; may be directly connected, can also be connected indirectly through intervening structures, it may be in communication the interior of the two elements. Those of ordinary skill in the art, be appreciated that the specific circumstances of the specific meanings in the present invention.

The terminology used herein is for describing particular embodiments only and is not intended to limit embodiments to an exemplary embodiment. Unless the context clearly indicates otherwise, singular forms as used herein, "a", "an" are intended to include the plural. It should also be understood that, the terms "comprising" and/or "comprising", as used herein, specify the presence of stated features, integers, steps, operations, elements, and/or components, but do not preclude the presence or addition of one or more other features, integers, steps, operations, elements, components, and/or combinations thereof.

The touch display device of a preferable embodiment of this disclosure will be further described with reference to FIGS. 1 to 10, and units with similar structure are represented by the same reference numerals.

Figure 1B:
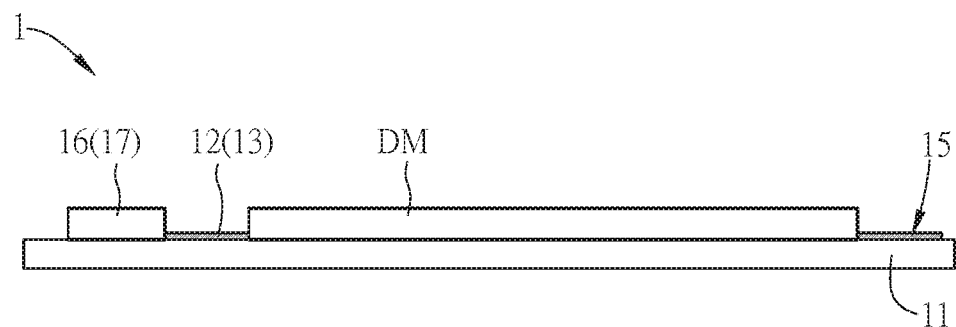
FIG. 1B is a schematic side view showing a touch display device of one embodiment of this disclosure.

FIG. 1A is a schematic view showing a touch display device of one embodiment of this disclosure. FIG. 1B is a schematic side view showing a touch display device of one embodiment of this disclosure. In FIGS. 1A and 1B, a first substrate 1 comprises a substrate 11, a plurality of row wires 12, a plurality of column wires 13, a plurality of unit pixels 14, an electroconductive protection 15, an area 16 and an area 17. The row wires 12 and the column wires 13 are interleaved to form a pixel matrix DM, and the unit pixels 14 are disposed inside the pixel matrix DM. The first substrate 1 is, for example, an active matrix substrate.

The substrate 11 is, for example, an insulation transparent substrate, and the material thereof may be a rigid material or a flexible material, such as glass or plastic and the like.

In the manufacturing process, the electroconductive protection 15 is firstly connected to the row wires 12 and the column wires 13, and the electroconductive protection 15 is disposed outside the pixel matrix DM on the first substrate 1. Therefore, in the manufacturing process, the electroconductive protection circuit 15 may serve as the short-circuit wiring to provide an electrostatic protection function, thereby electrically connecting the row wires 12 to the column wires 13, making the wires have equal potentials, and eliminating the damage of the liquid crystal display panel caused by the static electricity.

The electroconductive protection 15 may be made together with the row wires 12 and the column wires 13. For example, a section 151 of the electroconductive protection 15 is formed on the substrate 11 together with the row wire 12, a section 152 of the electroconductive protection 15 is formed on the substrate 11 together with the column wire 13, and the section 151 is connected to the section 152. Since the row wires and the column wires are usually metal wires, the electroconductive protection 15 is also a metal wire.

Wire drivers connected to the wires may be disposed in the area 16 and the area 17. For example, the row driver is disposed in the area 16, and the row driver is connected to the row wire 12 and outputs a row drive signal to the row wire 12; and the column driver is disposed in the area 17, and the column driver is connected to the column wire 13 and outputs a column drive signal to the column wire 13. Alternatively, the driver is not directly disposed in the area 16 and the area 17. Instead, a trace or a connection pad connected to the wire driver is disposed. The trace or the connection pad of the area 16 is connected to the row wire 12. The trace or the connection pad of the area 17 is connected to the column wire 13. The row driver and the column driver, which are respectively electrically connected to the area 16 and the area 17 and thus respectively electrically connected to the row wire 12 and the column wire 13 through flat cables or circuit boards and the like, can output the row drive signal and the column drive signal to the row wire 12 and the column wire 13, respectively.

For example, the row wire 12 is a scan line and comprises a plurality of scan lines S1 to Sm, the row driver is a scan drive circuit, and the row drive signal is a scan drive signal. The column wire is a data line and comprises a plurality of data lines D1 to Dn, the column driver is a data drive circuit, and a column drive signal is a data drive signal. The data lines D1 to Dn and the scan lines S1 to Sm are interleaved to define plurality of unit pixels 14.

In FIG. 1A, the electroconductive protection 15 is disposed along the edge on the first substrate 1. For example, the section 151 is disposed along the edge parallel to the row wire 12, and the section 152 is disposed along the edge parallel to the column wire 13. Opposite ends of the row wire 12 are respectively connected to the electroconductive protection 15 and the area 16, and opposite ends of the column wire 13 are respectively connected to the electroconductive protection 15 and the area 17.

For the row driver disposed on the area 16, the row driver is connected to the row wire 12 and located on one side of the first substrate 1 without the electroconductive protection 15, and the row driver is electrically connected to the row wires 12 on one side of the first substrate 1 without the electroconductive protection 15. For the column driver disposed on the area 17, the column driver is connected to the column wire 13 and located on one side of the first substrate 1 without the electroconductive protection 15, and the column driver is electrically connected to the column wires 13 on the one side of the first substrate 11 without the electroconductive protection 15. The row driver and the column driver are located on different sides of the first substrate 1.

On the other hand, for the row driver not directly disposed on the area 16, the row driver is electrically connected to the row wires 12 on one side of the first substrate 1 without the electroconductive protection 15. For the column driver not directly disposed on the area 17, the column driver is electrically connected to the column wires 13 on the one side of the first substrate 11 without the electroconductive protection 15.

Figure 1C:
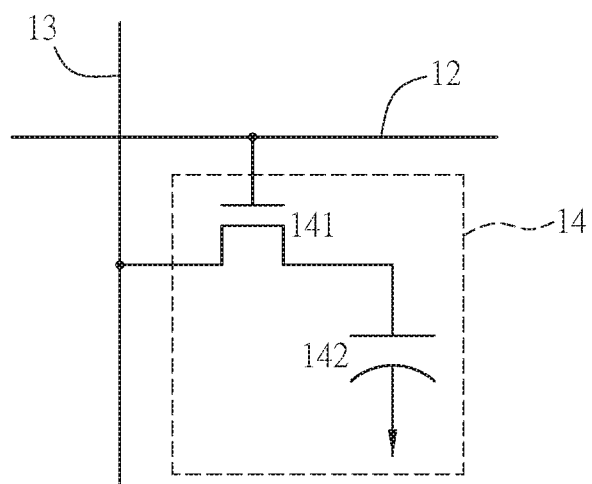
FIG. 1C is a schematic view showing a unit pixel according to one embodiment of this disclosure.

FIG. 1C is a schematic view showing a unit pixel according to one embodiment of this disclosure. As shown in FIG. 1C, the pixel drive element of the unit pixel 14 comprises a thin film transistor 141 and a pixel capacitor 142. The thin film transistor 141 is used as a switch, and a gate is connected to the row wire 12, a source is connected to the column wire 13, and a drain is connected to the pixel capacitor 142. The scan drive signal on the row wire 12 may control the thin film transistor 141 to turn on, thereby enabling the data drive signal on the column wire 13 to be written into the pixel capacitor 142.

The pixel capacitor 142 is a liquid crystal capacitor and constituted by two electrodes. Generally speaking, the liquid crystal capacitor comprises a pixel electrode and a common electrode, the drain of the thin film transistor 141 is connected to the pixel electrode, and the common electrode is connected to a common voltage (Vcom). In some embodiments, the voltage value of the common voltage may be 0 volts (grounded). When the gate of the thin film transistor 141 is applied with a scan drive signal by the row wire 12 to turn on, the data voltage of the data drive signal on the column wire 13 is applied to the pixel electrode through the thin film transistor 141, so that a voltage difference is generated between the pixel electrode and the common electrode, the liquid crystal capacitor stores the potential difference written by the data drive signal to drive liquid crystal molecules between the two electrodes to rotate.

The materials of the pixel electrode and the common electrode may be, for example but without limitation to, transparent electroconductive materials comprising indium-tin oxide (ITO), indium-zinc oxide (IZO) or the like.

Different types of display panels have different configurations of the pixel electrode and the common electrode. For the transversal electric field effect display panel, both the pixel electrode and the common electrode are formed on the first substrate 1. That is, they and the thin film transistor 141 are formed on the same substrate 11. Under this architecture, one whole piece of the common electrode needs not to be formed on the opposing substrates, so that there is more space to form the touch electrode. For the multi-domain vertical alignment panel or twisted nematic panel, the one whole piece of the common electrode is formed on the opposing substrates, both the pixel electrode and the thin film transistor 141 are formed on the first substrate 1, and the pixel electrode on the first substrate 1 and the common electrode on the opposing substrate constitute the liquid crystal capacitor.

FIG. 1C is a basic element that illustrates a typical unit pixel, so only one thin film transistor 141 and one pixel capacitor 142 are shown. In other implementation aspects, the unit pixel may also comprise a plurality of thin film transistors and other capacitive elements. In one embodiment, each pixel may further have a storage electrode (not shown), which may form an auxiliary capacitor together with the second electrode.

Referring back to FIG. 1A, the electroconductive protection 15 is located on the opposite sides of the area 16 and the area 17 on the first substrate 1, the electroconductive protection 15 is a portion of the short-circuit wiring, the short-circuit wiring is used for short-circuiting the end portion of the row wire 12 and the end portion of the column wire 13 to prevent static electricity from damaging the display panel, such as breakdown and characteristic defects of the thin film transistor 5.

The electroconductive protection 15 should be disconnected from the row wire 12 and the column wire 13 so that the liquid crystal panel can work normally, and the electroconductive protection 15 may be disconnected from the row wires 12 and the column wires 13 by the laser beam along alternate long or short dashed lines or outside the dashed lines shown in FIG. 1. The electroconductive protection 15 is a remaining portion of the short-circuit wiring which is originally connected to the row wires 12 and the column wires 13 on the first substrate 1 obtained after cutting.

After the electroconductive protection 15 is cut from the row wire 12 and the column wire 13, the liquid crystal display panel again faces the problem caused by static electricity, such as feature defects caused by the component breakdown and the component breakdown. In order to avoid the problem, the electroconductive protection 15 may be electrically connected to the touch electrode in the touch display device.

Figure 2A:
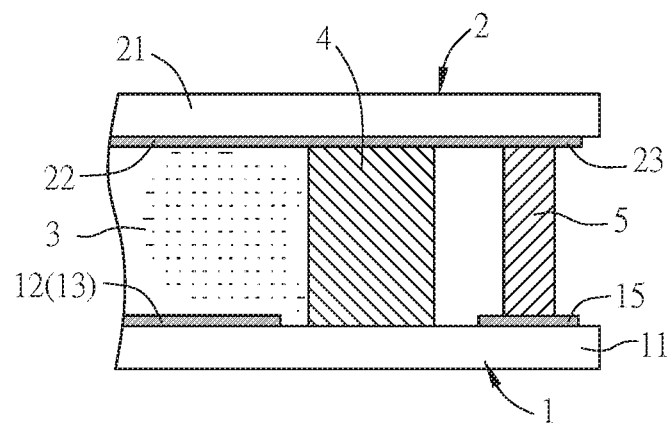
FIG. 2A is a schematic side view showing a touch display device of one embodiment of this disclosure.
Figure 2B:
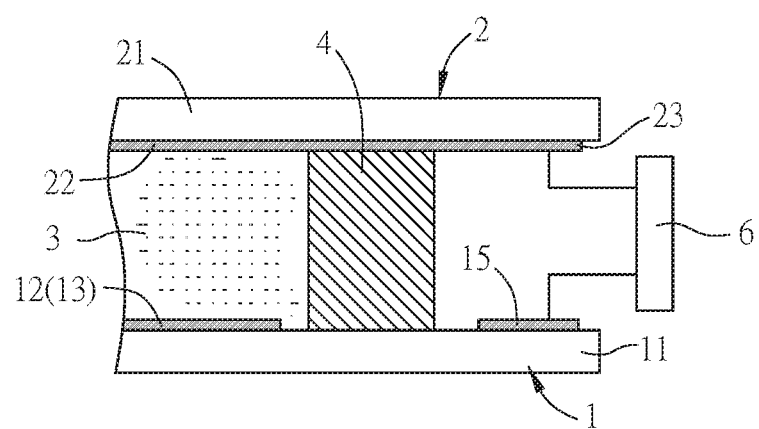
FIG. 2B is a schematic side view showing a touch display device of one embodiment of this disclosure.

FIG. 2A is a schematic side view showing a touch display device of one embodiment of this disclosure. FIG. 2B is a schematic side view showing a touch display device of one embodiment of this disclosure. As shown in FIGS. 2A and 2B, the electroconductive protection 15 is at a distance from the row wire 12 or the column wire 13. The touch display device comprises the first substrate 1, a second substrate 2, a display medium 3 and a sealing member 4. The second substrate 2 is disposed opposite to the first substrate 1. If the transversal electric field effect display technology is used, then the display medium 3, the first substrate 1 and the second substrate 2 function as a transversal electric field effect display panel.

The display medium 3 is interposed between inner sides of the first substrate 1 and the second substrate 2, and the display medium 3 is, for example, a liquid crystal. The sealing member 4 is interposed between the inner sides of the first substrate 1 and the second substrate 2, located between the pixel matrix DM and the electroconductive protection 15, and seals the display medium 3.

The second substrate 2 comprises a substrate 21 and a plurality of touch electrodes 22, and the touch electrodes 22 are formed on the substrate 21. The electroconductive protection 15 is electrically connected to the touch electrode 22.

In addition, the second substrate 2 may be provided with a filter layer (not shown), and the first substrate 1 and the second substrate 2 have elements, such as an alignment film and the like (not shown).

In FIG. 2A, the touch display device further comprises a conductive component 5, and the conductive component 5 is interposed between the inner sides of the first substrate 1 and the second substrate 2 and connected to the electroconductive protection 15 and an extension 23 of a touch electrode 22. The electroconductive protection 15 is electrically connected to the touch electrode 22 through the conductive component 5 disposed on the first substrate 1 and the second substrate 2. The conductive component 5 may directly contact the electroconductive protection 15 and the touch electrode 22.

In FIG. 2B, the touch display device further comprises an electroconductive trace 6, and the electroconductive trace 6 is disposed outside the first substrate 1 and the second substrate 2, and connected to the electroconductive protection 15 and the extension 23 of the touch electrode 22. The electroconductive protection 15 is electrically connected to the touch electrode 22 through the electroconductive trace 6 disposed outside the first substrate 1 and the second substrate 2, and the electroconductive trace 6 may contact the electroconductive protection 15 and the touch electrode 22 through the connection cables.

Under the architectures of FIGS. 2A and 2B, the row wire 12 and the column wire 13 can be individually operated. Since the liquid crystal display panel uses the remaining short-circuit as a protective wiring, the step of forming the protective wiring can be omitted. In addition, the conventional substrate having the short-circuit wiring is used as the first substrate 1, and the remaining short-circuit is electrically connected to the touch electrode 22 on the second substrate 2. The electroconductive protection 15 can still prevent the damage caused by external static electricity on the display panel.

Figure 3A:
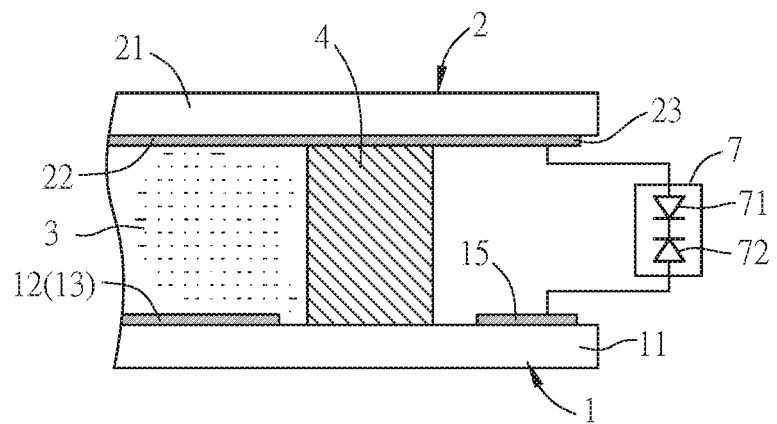
FIG. 3A is a schematic view showing electrical connection positions of the electroconductive protection of this disclosure.

In FIG. 3A, an electroconductive control assembly 7 comprises two diodes 71 and 72, which have reversely biased configurations serially connected together, and are electrically connected between the electroconductive protection 15 and the touch electrode 22. The diodes 71 and 72 are located outside the first substrate 1 and the second substrate 2, and connected to the electroconductive protection 15 and the extension 23 of the touch electrode 22. The electroconductive protection 15 is electrically connected to the touch electrode 22 through the diodes 71 and 72 disposed outside the first substrate 1 and the second substrate 2, and the diodes 71 and 72 may contact the electroconductive protection 15 and the touch electrode 22 through the connection cables.

Under general operating conditions, because the diode 72 is reversely biased to the touch electrode 22, the signal on the touch electrode 22 is not transmitted to the electroconductive protection 15. Because the diode 71 is reversely biased to the electroconductive protection 15, the small noise on the electroconductive protection 15 is also not transmitted to the touch electrode 22, so that the touch electrode 22 can operate independently.

When the static electricity is generated, the instantaneous voltage will be higher than the reversely biased of the diodes 71 and 72. Therefore, the diodes 71 and 72 are turned on, so that the electroconductive protection 15 is electrically connected to the touch electrode 22. The electroconductive protection 15 can prevent the damage caused by external static electricity on the pixel of the display panel.

Figure 3B:
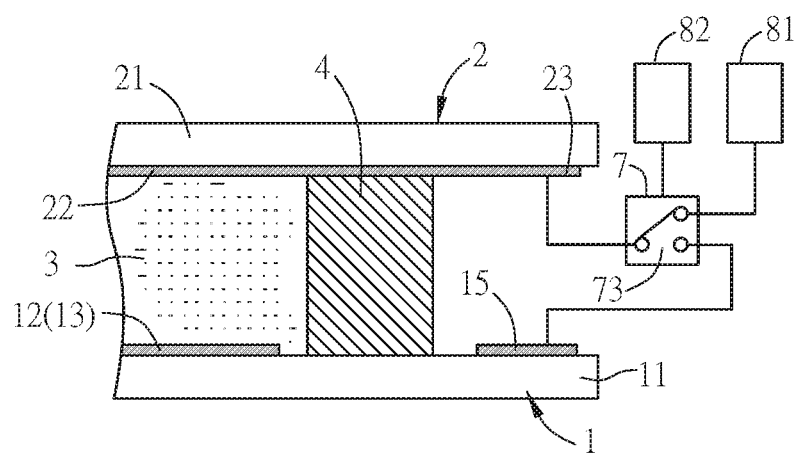
FIG. 3B is a schematic view showing electrical connection positions of the electroconductive protection of this disclosure.

In FIG. 3B, the electroconductive control assembly 7 comprises a switch 73 which selectively electrically connects the touch electrode 22 to the electroconductive protection 15 or a touch circuit 81. The switch 73 is located outside the first substrate 1 and the second substrate 2 and connected to the electroconductive protection 15 and the extension 23 of the touch electrode 22. The electroconductive protection 15 is electrically connected to the touch electrode 22 through the switch 73 disposed outside the first substrate 1 and the second substrate 2, and the switch 73 may contact the electroconductive protection 15 and the touch electrode 22 through the connection cables.

A control circuit 82 controls the switch 73 to electrically connect the electroconductive protection 15 or the touch circuit 81. Under general operating conditions, the control circuit 82 controls the switch 73, so that the touch electrode 22 is electrically connected to the touch circuit 81, thereby carrying out the conventional touch function. In the case where the static electricity is generated, the control circuit 82 controls the switch 73, so that the touch electrode 22 is electrically connected to the electroconductive protection 15, thereby carrying out the electrostatic protection function.

For example, the control circuit 82 can switch the target electrically connected to the touch electrode 22 in a time-sharing manner. For example, the switch 73 is switched from the touch circuit 81 to the electroconductive protection 15 every other period of time. At the same time, the touch circuit 81 does not perform the touch function to prevent the electrostatic damage on the electroconductive protection 15 and the touch electrode 22. The switch 73 is again switched from the electroconductive protection 15 to the touch circuit 81 every period of time. At the same time, the touch circuit 81 and the touch electrode 22 perform the touch function. Since the switch 73 does not allow the touch electrode 22 to be electrically connected to the electroconductive protection 15, the small noise on the electroconductive protection 15 is also not transmitted to the touch electrode 22, so that the touch electrode 22 can operate independently.

The control circuit 82 is, for example, a controller in the display panel, and the touch circuit 81 is, for example, a touch detection circuit or a touch excitation circuit.

Under the architectures of FIGS. 3A and 3B, the row wire 12 and the column wire 13 can be individually operated. The touch electrode 22 may also be individually operated. Since the liquid crystal display panel uses the remaining short-circuit as a protective wiring, the step of forming the protective wiring can be omitted. In addition, the conventional substrate having the short-circuit wiring is used as the first substrate 1, and the remaining short-circuit is electrically connected to the touch electrode 22 on the second substrate 2. The electroconductive protection 15 can still prevent the damage caused by external static electricity on the display panel.

Figure 4A:
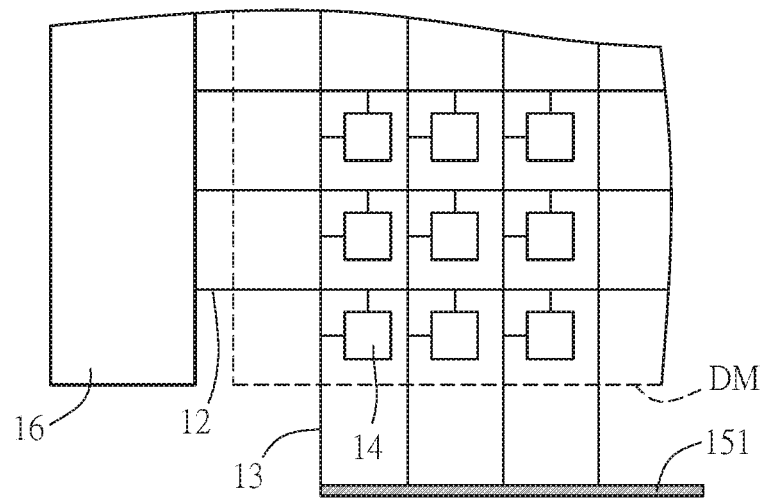
FIG. 4A is a schematic view showing electrical connection positions of the electroconductive protection of this disclosure.

FIG. 4A is a schematic view showing electrical connection positions of the electroconductive protection of this disclosure. As shown in FIG. 4A, the section 151 of the electroconductive protection 15 is directly used as a terminal connected the conductive component 5 in FIG. 2A. On the second substrate 2, the touch electrode 22 has the corresponding extension 23 as a terminal connected to the conductive component 5 in FIG. 2A, thereby implementing the electrical connection. In addition, FIG. 4A only illustrates the section 151 parallel to the row wire 12 as an example. The section 151 can also directly used as a terminal connected the conductive component 5 in FIG. 4A. On the second substrate 2, the touch electrode 22 has the corresponding extension 23 as a terminal connected to the conductive component 5 in FIG. 2A, thereby implementing the electrical connection.

Figure 4B:
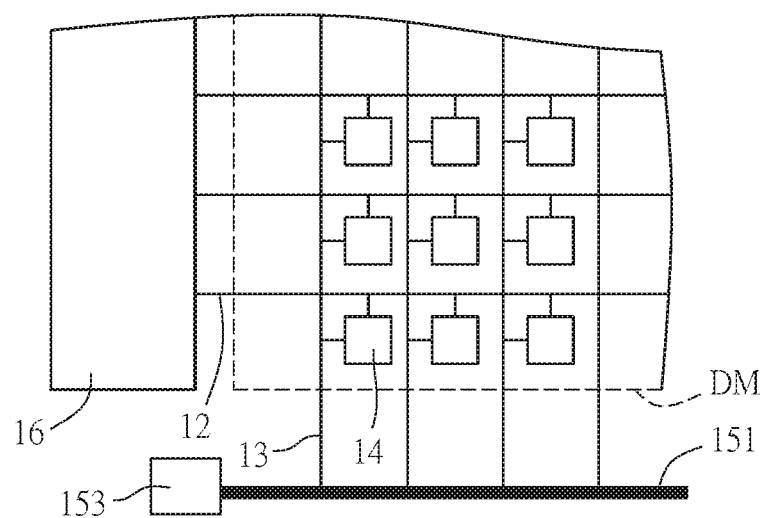
FIG. 4B is a schematic view showing electrical connection positions of the electroconductive protection of this disclosure.

FIG. 4B is a schematic view showing electrical connection positions of the electroconductive protection of this disclosure. As shown in FIG. 4B, the section 151 of the electroconductive protection 15 extends to an end portion 153, and the end portion 153 is used as a terminal connected to the conductive component 5 in FIG. 2A, and on the second substrate 2, the touch electrode 22 has the corresponding extension 23 as a terminal connected to the conductive component 5 in FIG. 2A, thereby implementing the electrical connection. In addition, FIG. 4B only illustrates the section 151 parallel to the row wire 12 as an example, the section 152 may also extend to another end portion, the another end portion is located beside the area 17, and the another end portion is used as a terminal connected to the conductive component 5 in FIG. 2A, and on the second substrate 2, the touch electrode 22 has the corresponding extension 23 as a terminal connected to the conductive component 5 in FIG. 2A, thereby implementing the electrical connection.

In addition, in FIG. 4B, the end portion 153 or the another end portion may be used as a terminal electrically connected to the electroconductive trace 6 in FIG. 2B, on the second substrate 2, the touch electrode 22 has the corresponding extension 23 as a terminal connected to the electroconductive trace 6 in FIG. 2B, thereby implementing the electrical connection.

In addition, in FIG. 4B, the section 151 of the electroconductive protection 15 extends to the end portion 153, and the end portion 153 is used as a terminal electrically connected to the electroconductive control assembly 7 in FIG. 3A or 3B, and on the second substrate 2, the touch electrode 22 has the corresponding extension 23 as a terminal connected to the electroconductive control assembly 7 in FIG. 3A or 3B, thereby implementing the electrical connection. In addition, FIG. 4B only illustrates the section 151 parallel to the row wire 12 as an example, the section 152 may also extend to another end portion, the another end portion is located beside the area 17, and the another end portion is used as a terminal electrically connected to the electroconductive control assembly 7 in FIG. 3A or 3B, and on the second substrate 2, the touch electrode 22 has the corresponding extension 23 as a terminal connected to the electroconductive control assembly 7 in FIG. 3A or 3B, thereby implementing the electrical connection.

Figure 5A:
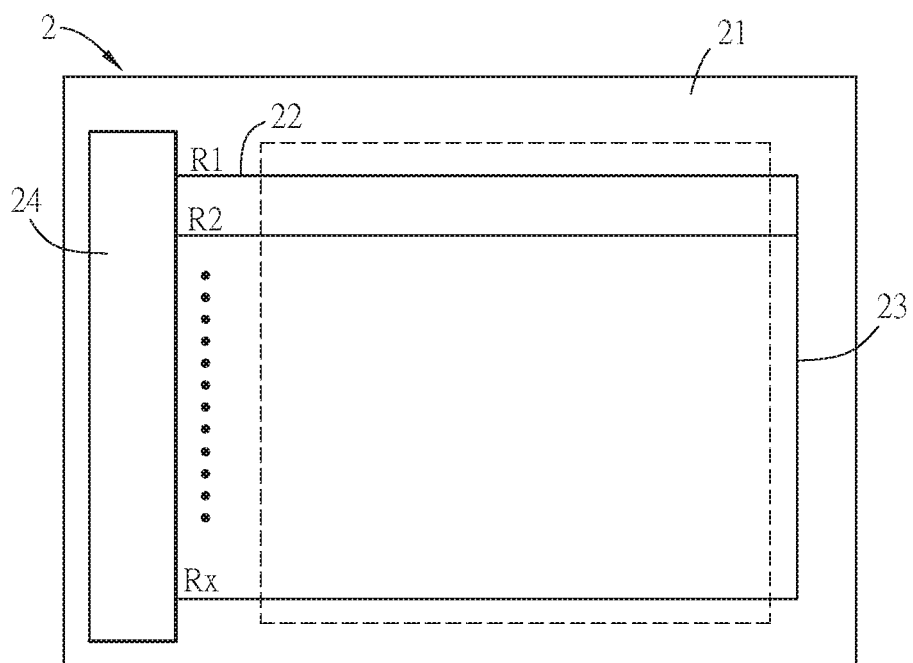
FIG. 5A is a schematic view showing a touch electrode of this disclosure.
Figure 5B:
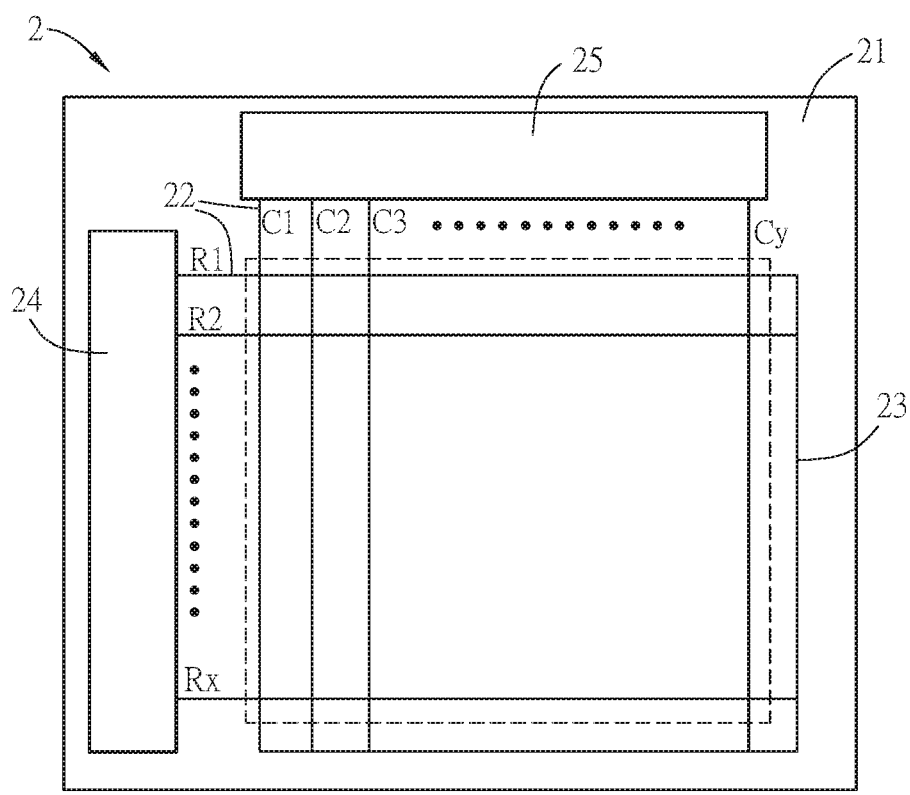
FIG. 5B is a schematic view showing a touch electrode of this disclosure.

FIG. 5A is a schematic view showing a touch electrode of this disclosure. FIG. 5B is a schematic view showing a touch electrode of this disclosure. As shown in FIGS. 5A and 5B, there are a plurality of touch electrodes 22 on the second substrate 2, and the touch electrodes 22 are commonly connected to the extension 23. In order to reduce the interference, the extension 23 between the plurality of touch electrodes 22 may be designed to be narrower. For example, the width of the extension 23 is narrower than that of the touch electrode 22. For one touch electrode 22, the equivalent resistance of the extension 23 and the other touch electrodes 22 will thus become larger, this can prevent the signal on the touch electrode 22 from being transmitted to the other touch electrodes 22 to cause interference, and the touch electrode 22 is not interfered by the signals on the other touch electrodes 22.

In addition, the touch electrode 22 may not be connected to each other, and each of the extensions 23 is connected to the touch electrode 22.

In addition, FIGS. 5A and 5B illustrate the arrangement of the touch electrodes 22 and do not limit the shape of the touch electrode 22. Generally, the unit shape of the touch electrode 22 is a rhombus.

In FIGS. 5A and 5B, a touch circuit connecting to the touch electrode 22 may be disposed in an area 24 and an area 25. Alternatively, the touch circuit is not directly disposed in the area 24 and the area 25, but the trace or the connection pad connected to the touch circuit is provided. The touch circuit is electrically connected to the area 24 and the area 25 through flat cables or circuit boards and the like.

In FIG. 5A, the touch electrode 22 is one part of the touch electrode of the touch display device, and another part of the touch electrode of the touch display device is disposed on the first substrate 1. The touch electrode 22 may be a detection electrode or an excitation electrode. The touch electrode 22 has a plurality of rows R1 to Rx.

In FIG. 5B, the touch electrodes 22 are the whole touch electrodes of the touch display device, and the touch electrodes are arranged in an array. The touch electrodes 22 may be divided into detection electrodes and excitation electrodes. For example, the row touch electrode 22 is the detection electrode, and the column touch electrode 22 is the excitation electrode; or the row touch electrode 22 is the excitation electrode, and the column touch electrode 22 is the detection electrode. The touch electrode 22 has a plurality of rows R1 to Rx and a plurality of columns C1 to Cy.

In summary, in the touch display device of this disclosure, the electroconductive protection is electrically isolated from the row wires and the column wires, and is electrically connected to the touch electrode. Therefore, the pixel drive element can be protected from having the problem caused by static electricity.

The above embodiments are described by taking the in-cell touch display device as an example, and the following is described by taking an add-on touch display device as an example.

Figure 6A:
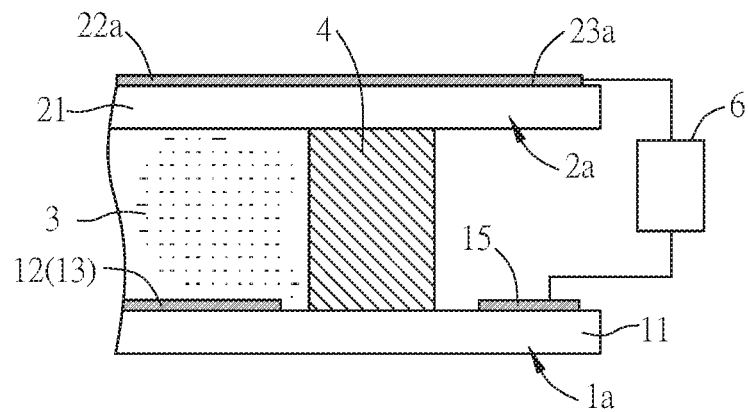
FIG. 6A is a schematic side view showing a touch display device of one embodiment of this disclosure.
Figure 6B:
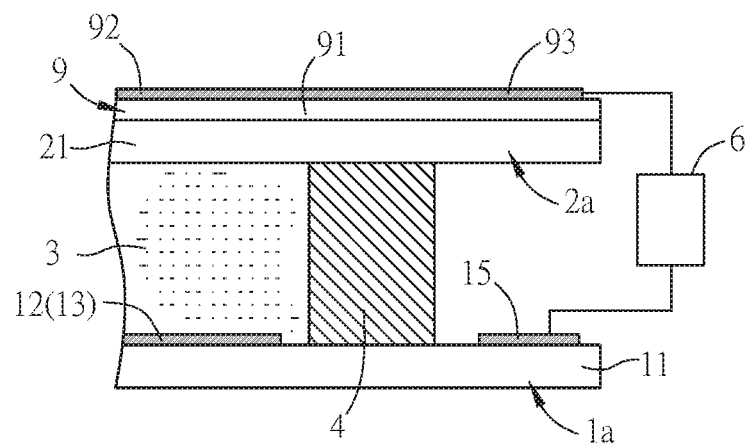
FIG. 6B is a schematic side view showing a touch display device of one embodiment of this disclosure.

FIG. 6A is a schematic side view showing a touch display device of one embodiment of this disclosure. FIG. 6B is a schematic side view showing a touch display device of one embodiment of this disclosure. As shown in FIG. 6A and FIG. 6B, the electroconductive protection 15 is at a distance from the row wire 12 or the column wire 13. The touch display device comprises the first substrate 1a, a second substrate 2a, a display medium 3 and a sealing member 4. The second substrate 2a is disposed opposite to the first substrate 1a.

The display medium 3 is interposed between inner sides of the first substrate 1a and the second substrate 2a, and the display medium 3 is, for example, a liquid crystal. The sealing member 4 is interposed between the inner sides of the first substrate 1a and the second substrate 2a, located between the pixel matrix DM and the electroconductive protection 15, and seals the display medium 3.

The touch display device further comprises an electroconductive trace 5, and the electroconductive trace 5 is disposed outside the first substrate 1a and the second substrate 2a, and connected to the electroconductive protection 15 and the extension of the touch electrode. The electroconductive protection 15 is electrically connected to the touch electrode through the electroconductive trace 5 disposed outside the first substrate 1a and the second substrate 2a, and the electroconductive trace 5 may contact the electroconductive protection 15 and the touch electrode through the connection cables.

In addition, the second substrate 2a may be provided with a filter layer (not shown), and the first substrate 1a and the second substrate 2a have elements, such as an alignment film and the like (not shown).

In FIG. 6A, the second substrate 2a comprises a substrate 21 and a plurality of touch electrodes 22a, and the touch electrodes 22a are formed on an outer surface of the substrate 21. The electroconductive protection 15 is electrically connected to an extension 23a of the touch electrode 22a.

In FIG. 6B, the touch display device further comprises a touch panel 9, and the touch panel 9 is disposed on an outer surface of a second substrate 2a. The touch panel 9 comprises a substrate 91 and a touch electrode 92, and the touch electrode 92 is formed on the substrate 91 of the touch panel 9. The electroconductive protection 15 is electrically connected to an extension 93 of the touch electrode 92.

Under the architectures of FIGS. 6A and 6B, the row wires 12 and the column wires 13 can be individually operated, and the touch electrodes 22a and 92 may also be individually operated. Since the liquid crystal display panel uses the remaining short-circuit as a protective wiring, the step of forming the protective wiring can be omitted. In addition, the conventional substrate having the short-circuit wiring is used as a first substrate 1a, and the remaining short-circuit is electrically connected to the touch electrodes 22a and 92 outside the second substrate 2a. The electroconductive protection 15 can still prevent the damage caused by external static electricity on the display panel.

FIGS. 7A to 7D are schematic side views showing a touch display device of one embodiment of this disclosure. As shown in FIGS. 7A to 7D, the touch display device further comprises an electroconductive control assembly 7, the electroconductive control assembly 7 is located outside the first substrate 1a and the second substrate 2a and connected to the electroconductive protection 15 and an extension of the touch electrode. The electroconductive protection 15 is electrically connected to the touch electrode through the electroconductive control element 7 disposed outside the first substrate 1a and the second substrate 2a, and the electroconductive control element 7 may contact the electroconductive protection 15 and the touch electrode through the connection cables.

In addition, the second substrate 2a may be provided with a filter layer (not shown), and the first substrate 1a and the second substrate 2a have elements, such as an alignment film and the like (not shown).

Figure 7A:
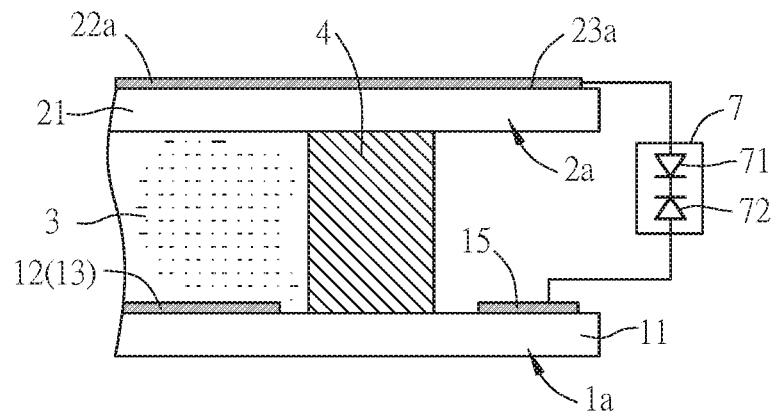
FIGS. 7A to 7D are schematic side views showing a touch display device of one embodiment of this disclosure.
Figure 7B:
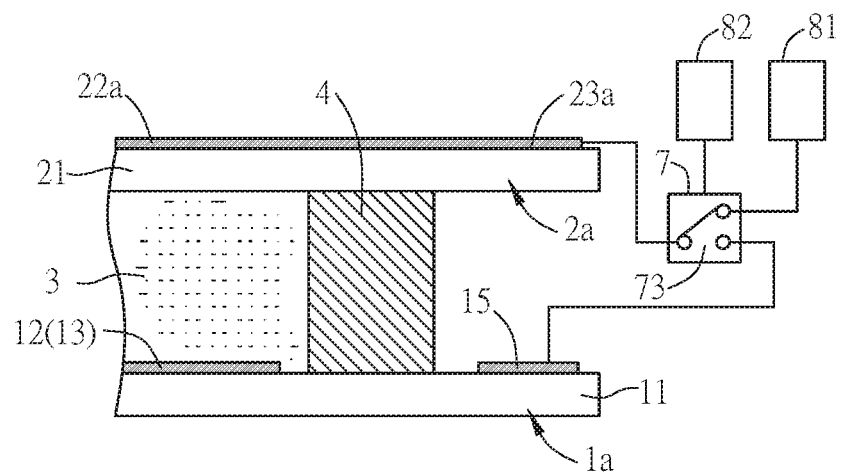

In FIGS. 7A and 7B, the second substrate 2a comprises a substrate 21 and a plurality of touch electrodes 22a, and the touch electrodes 22a are formed on an outer surface of the substrate 21. The electroconductive protection 15 is electrically connected to an extension 23a of the touch electrode 22a.

Figure 7C:
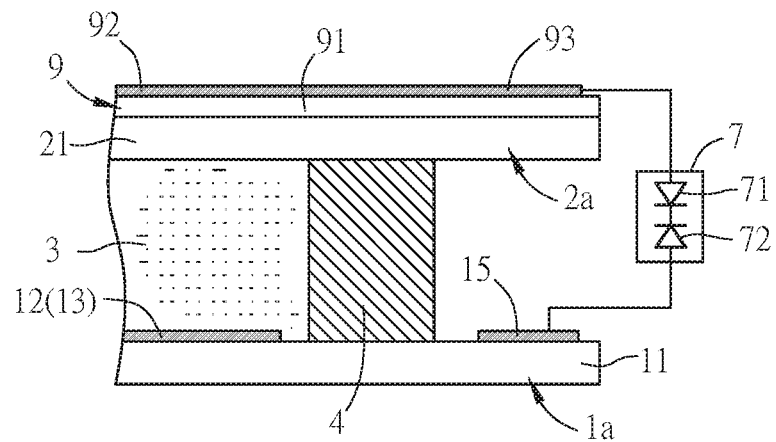
Figure 7D:
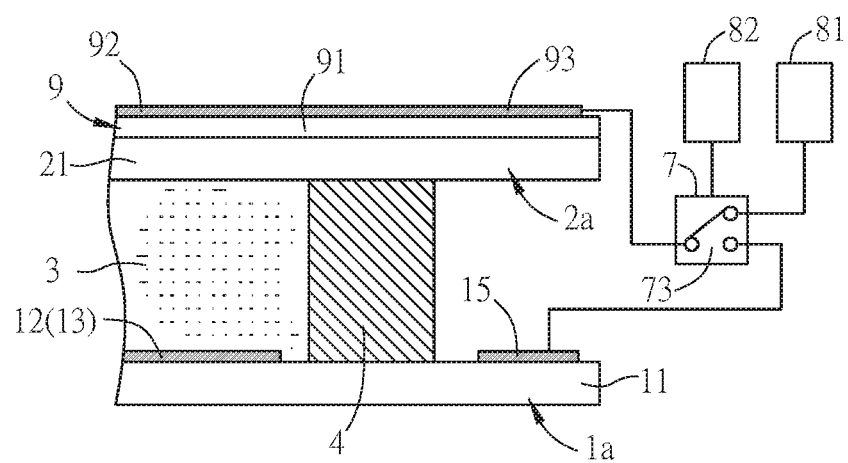

In FIGS. 7C and 7D, the touch display device further comprises a touch panel 9, and the touch panel 9 is disposed on an outer surface of a second substrate 2a. The touch panel 9 comprises a substrate 91 and a touch electrode 92, and the touch electrode 92 is formed on the substrate 91 of the touch panel 9. The electroconductive protection 15 is electrically connected to an extension 93 of the touch electrode 92.

In FIG. 7A, an electroconductive control assembly 7 comprises two diodes 71 and 72, which have reversely biased configurations serially connected together, and are electrically connected between the electroconductive protection 15 and the touch electrode 22a. The diodes 71 and 72 are located outside the first substrate 1a and the second substrate 2a, and connected to the electroconductive protection 15 and the extension 221 of the touch electrode 22a. The electroconductive protection 15 is electrically connected to the touch electrode 22a through the diodes 71 and 72 disposed outside the first substrate 1a and the second substrate 2a, and the diodes 71 and 72 may contact the electroconductive protection 15 and the touch electrode 22a through the connection cables.

Under general operating conditions, because the diode 72 is reversely biased to the touch electrode 22a, the signal on the touch electrode 22a is not transmitted to the electroconductive protection 15. Because the diode 71 is reversely biased to the electroconductive protection 15, the small noise on the electroconductive protection 15 is also not transmitted to the touch electrode 22a, so that the touch electrode 22a can operate independently.

When the static electricity is generated, the instantaneous voltage will be higher than the reversely biased of the diodes 71 and 72. Therefore, the diodes 71 and 72 are turned on, so that the electroconductive protection 15 is electrically connected to the touch electrode 22a. The electroconductive protection 15 can prevent the damage caused by external static electricity on the pixel of the display panel.

In FIG. 7B, the electroconductive control assembly 7 comprises a switch 73 which selectively electrically connects the touch electrode 22a to the electroconductive protection 15 or a touch circuit 81. The switch 73 is located outside the first substrate 1a and the second substrate 2a and connected to the electroconductive protection 15 and the extension 221 of the touch electrode 22a. The electroconductive protection 15 is electrically connected to the touch electrode 22a through the switch 73 disposed outside the first substrate 1a and the second substrate 2a, and the switch 73 may contact the electroconductive protection 15 and the touch electrode 22a through the connection cables.

A control circuit 82 controls the switch 73 to electrically connect the electroconductive protection 15 or the touch circuit 81. Under general operating conditions, the control circuit 82 controls the switch 73, so that the touch electrode 22a is electrically connected to the touch circuit 81, thereby carrying out the conventional touch function. In the case where the static electricity is generated, the control circuit 82 controls the switch 73, so that the touch electrode 22a is electrically connected to the electroconductive protection 15, thereby carrying out the electrostatic protection function.

For example, the control circuit 82 can switch the target electrically connected to the touch electrode 22a in a time-sharing manner. For example, the switch 73 is switched from the touch circuit 81 to the electroconductive protection 15 every other period of time. At the same time, the touch circuit 81 does not perform the touch function to prevent the electrostatic damage on the electroconductive protection 15 and the touch electrode 22a. The switch 73 is again switched from the electroconductive protection 15 to the touch circuit 81 every period of time. At the same time, the touch circuit 81 and the touch electrode 22a perform the touch function. Since the switch 73 does not allow the touch electrode 22a to be electrically connected to the electroconductive protection 15, the small noise on the electroconductive protection 15 is also not transmitted to the touch electrode 22a, so that the touch electrode 22a can operate independently.

The control circuit 82 is, for example, a controller in the display panel, and the touch circuit 81 is, for example, a touch detection circuit or a touch excitation circuit.

As shown in FIG. 7C, since the electroconductive control assembly 7 of FIG. 7C and the electroconductive control element 7 of FIG. 7A are the same or similar, so the relevant circuit property and operation may refer to the relevant description of the FIG. 7A.

Under the architectures of FIGS. 7A and 7D, the row wire 12 and the column wire 13 can be individually operated. The touch electrode 22a and 92 may also be individually operated. Since the liquid crystal display panel uses the remaining short-circuit as a protective wiring, the step of forming the protective wiring can be omitted. In addition, the conventional substrate having the short-circuit wiring is used as the first substrate 1a, and the remaining short-circuit is electrically connected to the touch electrode 22a, and 92 on the second substrate 2a. The electroconductive protection 15 can still prevent the damage caused by external static electricity on the display panel.

In summary, in the touch display device of this disclosure, the electroconductive protection is electrically isolated from the row wires and the column wires, and is electrically connected to the touch electrode. Therefore, the pixel drive element can be protected from having the problem caused by static electricity.

Figure 8A:
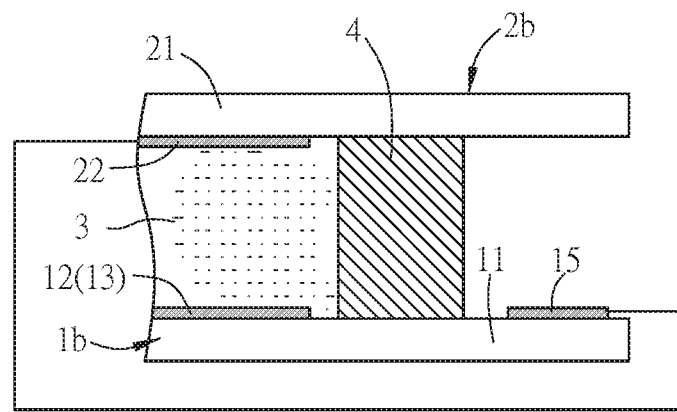
FIG. 8A is a schematic side view showing a touch display device of one embodiment of this disclosure.
Figure 8B:
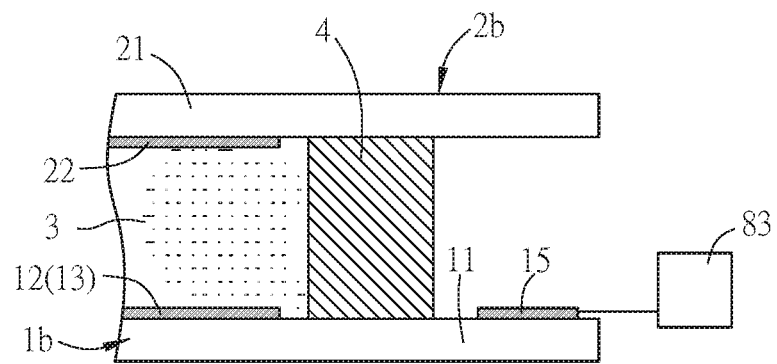
FIG. 8B is a schematic side view showing a touch display device of one embodiment of this disclosure.

FIG. 8A is a schematic side view showing a touch display device of one embodiment of this disclosure. FIG. 8B is a schematic side view showing a touch display device of one embodiment of this disclosure. As shown in FIGS. 2A and 2B, the remaining short-circuit wiring 15 obtained after cutting is at a distance from the row wire 12 or the column wire 13. A first substrate 1b is similar to the first substrate 1 in FIGS. 1A to 1C, and the first substrate 1b may comprise the assembly the same as or similar to that of the first substrate 1, so detailed descriptions thereof will be omitted.

The display medium 3 is interposed between the inner sides of the first substrate 1b and the second substrate 2b, display medium 3 is, for example, the liquid crystal. The sealing member 4 is interposed between the inner sides of the first substrate 1b and the second substrate 2b and located between the pixel matrix DM and the remaining short-circuit wiring 15 obtained after cutting to seal the display medium 3.

The second substrate 2b comprises a substrate 21 and a plurality of touch electrodes 22, and the touch electrodes 22 are formed on the substrate 21. The remaining short-circuit wiring 15 is electrically connected to the touch electrode 22.

In addition, the second substrate 2b may be provided with a filter layer (not shown), and the first substrate 1b and the second substrate 2b have elements, such as an alignment film and the like (not shown).

In FIG. 8A, the touch display device may comprise an electroconductive trace, which is disposed outside the first substrate 1b and the second substrate 2b, and connected to the remaining short-circuit wiring 15 obtained after cutting and the touch electrode 22. The electrical connection between the remaining short-circuit wiring 15 obtained after cutting and the touch electrode 22 is made through the electroconductive trace disposed outside the first substrate 1b and the second substrate 2b, and the electroconductive trace may contact the remaining short-circuit wiring 15 obtained after cutting and the touch electrode 22 through the connection cable. The electrical connection between the remaining short-circuit wiring 15 obtained after cutting and the touch electrode 22 provides the electrostatic protection in the manufacturing process.

Under the architecture of FIG. 8A, since the liquid crystal display panel utilizes the remaining short-circuit as the protective wiring, the step of forming the protective wiring can be omitted. In addition, by using the conventional substrate having the short-circuit wiring as the first substrate 1b and electrically connecting the remaining short-circuit to the touch electrode 22 on the second substrate 2b, the remaining short-circuit wiring 15 obtained after cutting still can prevent the damage caused by external static electricity on the display panel.

Then, as shown in FIG. 8B, the electrical connection between the remaining short-circuit wiring 15 obtained after cutting and the touch electrode 22 is removed, and the remaining short-circuit wiring 15 obtained after cutting is used as an antenna electrically connected to a communication control circuit 83. With regard to the remained short-circuit wiring, an antenna pattern may be designed to facilitate the radio transmission. In this manner, the short-circuit wiring 15 can be effectively utilized.

The elements of this embodiment may also refer to the descriptions of the elements with the symbols the same as or corresponding thereto in the embodiments of FIGS. 1A to 7D.

In summary, in the touch display device of this disclosure, the remaining short-circuit wiring obtained after cutting is electrically isolated from the row wires and the column wires, and is electrically connected to the touch electrode. Therefore, the pixel drive element can be protected from having the problem caused by static electricity In addition, in the above-mentioned embodiments, the row wires 12, the column wires 13, the unit pixel 14, the electroconductive protection 15, the area 16 and the area 17 are disposed on the front side of the first substrate 1, and the area 16 and the area 17 of the first substrate 1 may be respectively electrically connected to the row driver and the column driver through flat cables, circuit boards or the like. The row driver and the column driver may also be disposed on the backside of the first substrate 1, and such the configuration is beneficial to the display device with the narrow border.

Figure 9A:
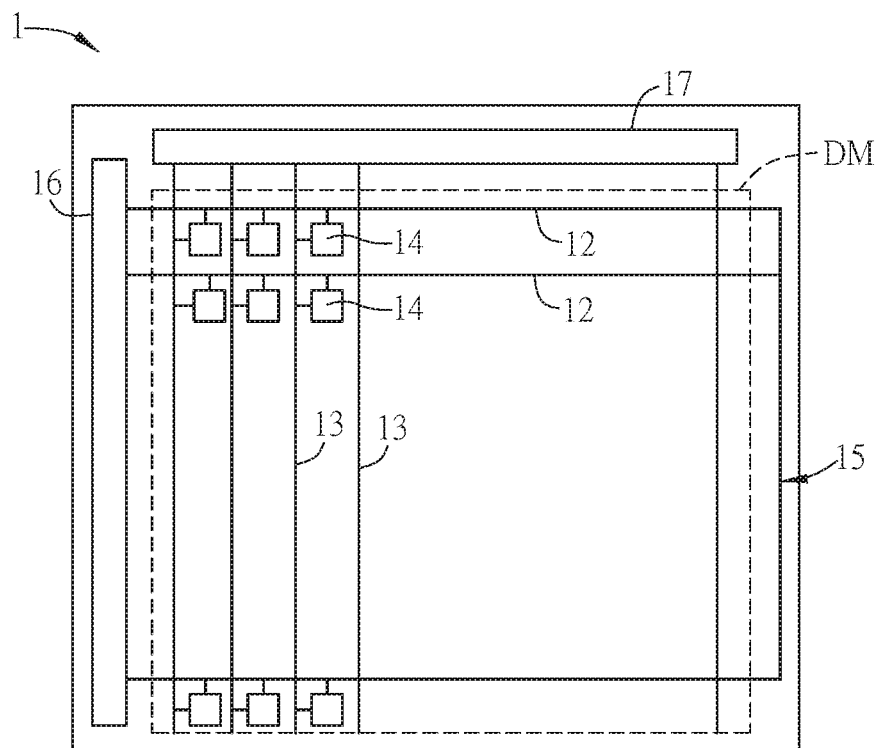
FIGS. 9A and 9B are schematic views showing a display device of one embodiment of this disclosure.
Figure 9B:
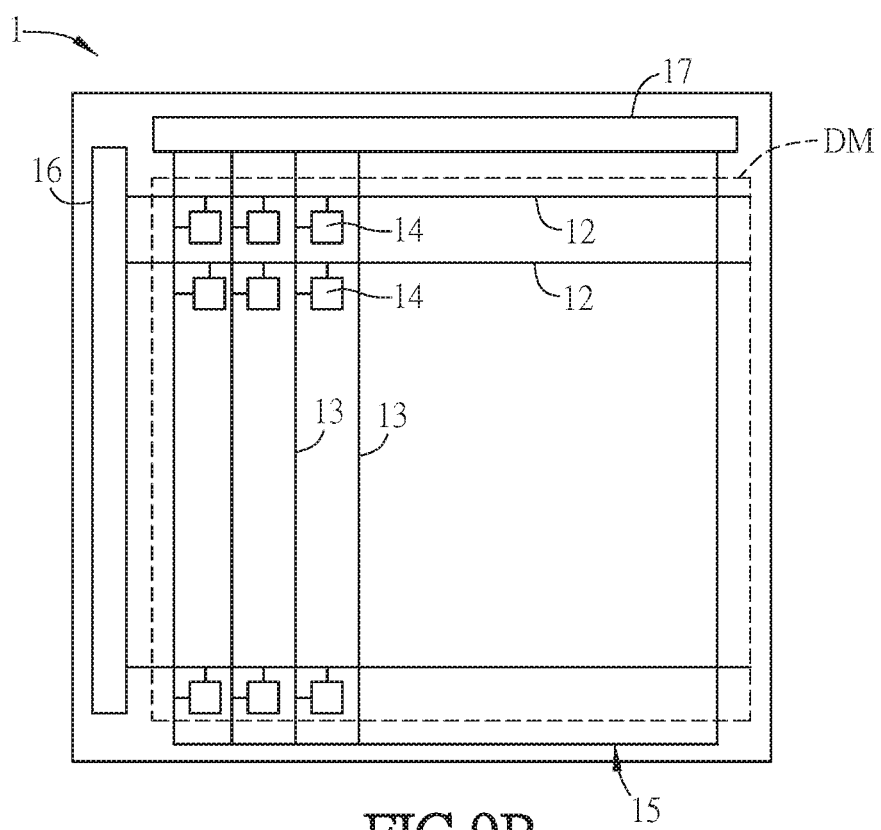

In addition to the row driver and the column driver disposed on the backside of the first substrate 1, in order to benefit the display device with the narrow border, a portion of the electroconductive protection 15 may further be removed to save the space occupied by the portion of the electroconductive protection 15 on the first substrate 1. For example, as shown in FIG. 9A, the electroconductive protection 15 is only disposed on one end of the row wire 12, and is not disposed on two ends of the column wire 13. As shown in FIG. 9B, the electroconductive protection 15 is only disposed on one end of the column wire 13, and is not disposed on two ends of the row wire 12. The modifications of the electroconductive protection 15 relating to FIGS. 9A and 9B may also be applied to the above-mentioned embodiments. The way of eliminating a portion of the electroconductive protection 15 may be performed by cutting off the portion of the short-circuit wiring, which is not to be kept, when the short-circuit wiring is being cut, and the remaining short-circuit wiring serves as the electroconductive protection 15.

Figure 10:
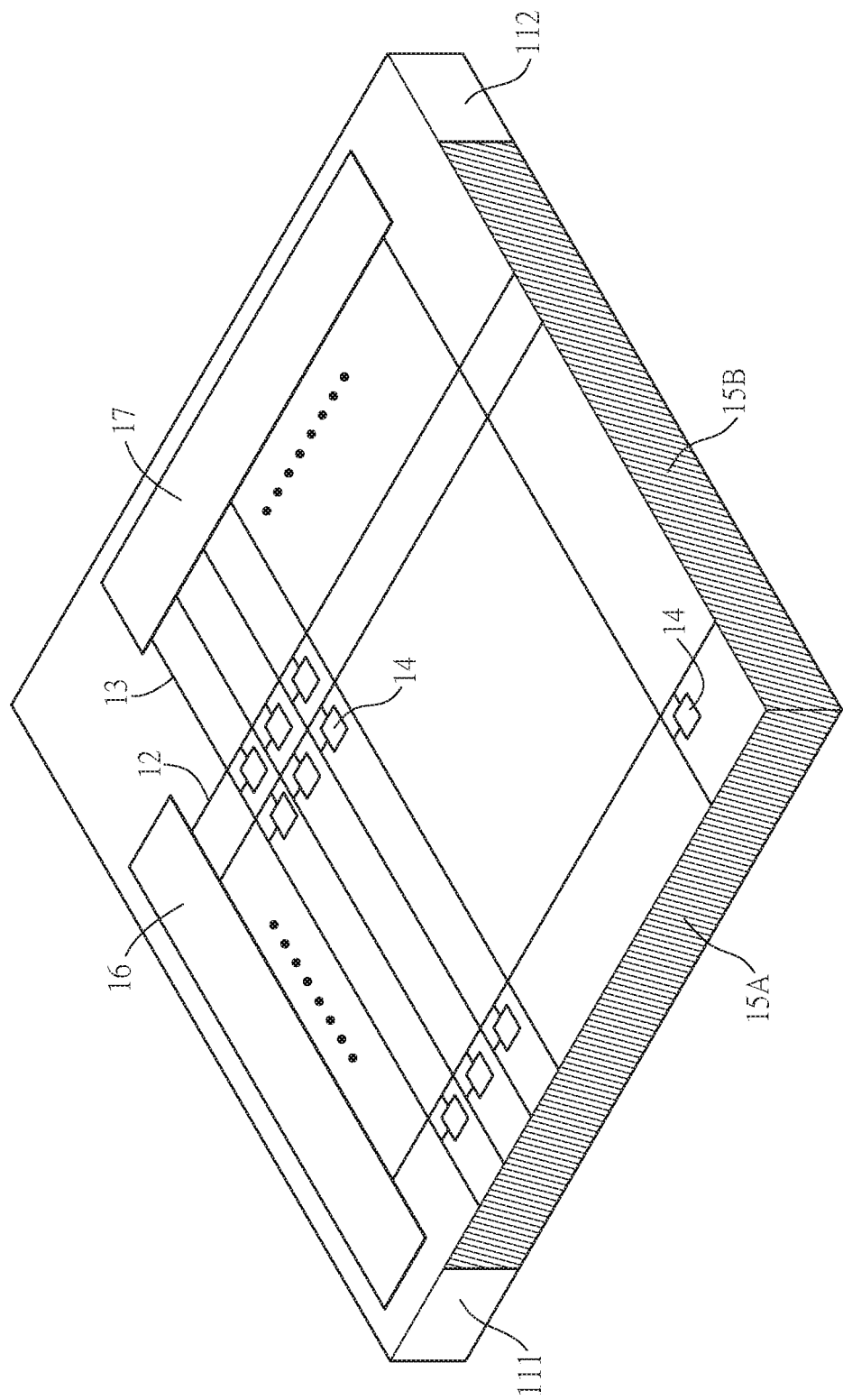
FIG. 10 is a schematic view showing a touch display device of one embodiment of this disclosure.

In addition, in the above-mentioned embodiments, the electroconductive protection 15 may be located on the lateral side of the substrate. For example, as shown in FIG. 10, the row wires 12, the column wires 13, the unit pixel 14, the area 16 and the area 17 are located on the front side of the first substrate 1, the electroconductive protection 15 is located on the lateral side of the substrate 11, and the electroconductive protection 15 comprises two sections 15A and 15B respectively located on different lateral sides 111 and 112 of the substrate 11. The other two lateral sides of the substrate 11 may have no electroconductive protection 15, and the lateral sides 111 and 112 are also not fully filled with the electroconductive protection 15.

The sections 15A and 15B are connected to each other. The electroconductive protection 15 is, for example, a conductive adhesive tape adhered to the lateral sides 111 and 112, or an L-shaped metal plate boxing the lateral sides 111 and 112 of the substrate is used.

In addition, the area 16 and the area 17 of the first substrate 1 may be respectively electrically connected to the row driver and the column driver through flat cables, circuit boards or the like. The row driver and the column driver may also be disposed on the backside of the first substrate 1, and such the configuration is beneficial to the display device with the narrow border.

The above contents with the specific embodiments of the present invention is further made to the detailed description, and specific embodiments of the present invention should not be considered limited to these descriptions. Those of ordinary skill in the art for the present invention, without departing from the spirit of the present invention, can make various simple deduction or replacement, and should be deemed to belong to the scope of the present invention.

What is claimed is:

1. A touch display device, comprising:
a first substrate including a plurality of row wires, a plurality of column wires and a plurality of pixel drive elements, wherein the row wires and the column wires are interleaved to form a pixel matrix, and the pixel drive elements are disposed on pixels of the pixel matrix;
a second substrate disposed opposite the first substrate;
a display medium interposed between inner sides of the first substrate and the second substrate;
a plurality of touch electrodes disposed on the inner side of the first substrate or the second substrate; and
an electroconductive protection, which is disposed outside the pixel matrix on the first substrate, electrically isolated from the row wires and the column wires, and electrically connected to the touch electrodes,
wherein the electroconductive protection is a remaining portion of short-circuit wiring which is originally connected to the row wires and the column wires on the first substrate obtained after cutting.

2. The touch display device according to claim 1, wherein the electroconductive protection is disposed along an edge of the first substrate.

3. The touch display device according to claim 1, further comprising:
a row driver connected to the row wires and located on one side of the first substrate without the electroconductive protection; and
a column driver connected to the column wires and located on the one side of the first substrate without the electroconductive protection.

4. The touch display device according to claim 1, further comprising:
a row driver electrically connected to the row wires on one side of the first substrate without the electroconductive protection; and
a column driver electrically connected to the column wires on the one side of the first substrate without the electroconductive protection.

5. The touch display device according to claim 1, further comprising:
a sealing member, which is interposed between inner sides of the first substrate and the second substrate, located between the pixel matrix and the electroconductive protection and seals the display medium.

6. The touch display device according to claim 1, further comprising:
a conductive component, which is interposed between the inner sides of the first substrate and the second substrate and connected to the electroconductive protection and an extension of the touch electrode.

7. The touch display device according to claim 1, further comprising:
an electroconductive trace disposed outside the first substrate and the second substrate, and connected to the electroconductive protection and an extension of the touch electrode.

8. The touch display device according to claim 1, wherein the touch electrodes are commonly connected to an extension.

9. The touch display device according to claim 1, wherein the touch display device is a transversal electric field effect display panel.

10. A transversal electric field effect touch display device, comprising:
a first substrate including a plurality of row wires, a plurality of column wires and a plurality of pixel drive elements, wherein the row wires and the column wires are interleaved to form a pixel matrix, and the pixel drive elements are disposed on pixels of the pixel matrix;
a second substrate disposed opposite the first substrate;
a display medium interposed between inner sides of the first substrate and the second substrate;
a plurality of touch electrodes disposed on the inner side of the second substrate, and the touch electrodes are not connected to each other;
an electroconductive protection, which is disposed outside the pixel matrix on the first substrate along an edge of the first substrate, and electrically isolated from the row wires and the column wires, and the electroconductive protection is a remaining portion of short-circuit wiring which is originally connected to the row wires and the column wires on the first substrate obtained after cutting;

a sealing member, which is interposed between inner sides of the first substrate and the second substrate, located between the pixel matrix and the electroconductive protection and seals the display medium; and an electroconductive trace disposed outside the first substrate and the second substrate, and connected to the electroconductive protection and an extension of the touch electrode.

11. A touch display device, comprising:

a first substrate including a plurality of row wires, a plurality of column wires and a plurality of pixel drive elements, wherein the row wires and the column wires are interleaved to form a pixel matrix, and the pixel drive elements are disposed on pixels of the pixel matrix;

a second substrate disposed opposite the first substrate;

a display medium interposed between inner sides of the first substrate and the second substrate;

a plurality of touch electrodes disposed on the inner side of the second substrate; and an electroconductive protection, which is disposed outside the pixel matrix on the first substrate, electrically isolated from the row wires and the column wires, and electrically connected to the touch electrodes, wherein the electroconductive protection is a remaining portion of short-circuit wiring which is originally connected to the row wires and the column wires on the first substrate obtained after cutting.

12. The touch display device according to claim 11, wherein the electroconductive protection is disposed along an edge of the first substrate.

13. The touch display device according to claim 11, further comprising:

a row driver connected to the row wires and located on one side of the first substrate without the electroconductive protection; and a column driver connected to the column wires and located on the one side of the first substrate without the electroconductive protection.

14. The touch display device according to claim 11, further comprising:

a row driver electrically connected to the row wires on one side of the first substrate without the electroconductive protection; and a column driver electrically connected to the column wires on the one side of the first substrate without the electroconductive protection.

15. The touch display device according to claim 11, further comprising:

a sealing member, which is interposed between inner sides of the first substrate and the second substrate, located between the pixel matrix and the electroconductive protection and seals the display medium.

16. The touch display device according to claim 11, further comprising:

an electroconductive trace disposed outside the first substrate and the second substrate, and connected to the electroconductive protection and an extension of the touch electrode.

17. The touch display device according to claim 11, wherein the touch display device is a transversal electric field effect display panel.

18. The touch display device according to claim 11, wherein the display medium, the first substrate and the second substrate function as a transversal electric field effect display panel.

* * * * *